United States Patent
Liu et al.

(10) Patent No.: US 9,451,271 B2
(45) Date of Patent: Sep. 20, 2016

(54) ADAPTIVE FILTERING BASED ON PATTERN INFORMATION

(75) Inventors: Ying Liu, Waterloo (CA); Dake He, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 444 days.

(21) Appl. No.: 13/187,961

(22) Filed: Jul. 21, 2011

(65) Prior Publication Data

US 2013/0022099 A1    Jan. 24, 2013

(51) Int. Cl.
| H04N 7/26 | (2006.01) |
| H04N 19/17 | (2014.01) |
| H04N 19/46 | (2014.01) |
| H04N 19/117 | (2014.01) |
| H04N 19/136 | (2014.01) |

(52) U.S. Cl.
CPC ............ *H04N 19/17* (2014.11); *H04N 19/117* (2014.11); *H04N 19/136* (2014.11); *H04N 19/46* (2014.11)

(58) Field of Classification Search
CPC .... H04N 19/46; H04N 19/17; H04N 19/136; H04N 19/117
USPC ......................................................... 375/240
See application file for complete search history.

(56) References Cited

U.S. PATENT DOCUMENTS

| 7,782,339 B1 | 8/2010 | Hobbs et al. | |
| 2010/0254463 A1* | 10/2010 | Narroschke | H04N 19/147 375/240.29 |

FOREIGN PATENT DOCUMENTS

| CA | 2584065 | 4/2006 |
| CA | 2738037 | 4/2010 |
| CA | 2764868 | 12/2010 |
| CN | 1535024 | 10/2004 |

OTHER PUBLICATIONS

Ojala, Timo, et al., "Multiresolution Gray-Scale and Rotation Invariant Texture Classification with Local Binary Patterns," IEEE Transactions on Pattern Analysis and Machine Intelligence, vol. 24, No. 7, Jul. 2002, pp. 971-987.
List, Peter, et al., "Adaptive Deblocking Filter," IEEE Transactions on Circuits and Systems for Video Technology, vol. 13, No. 7, Jul. 2003, pp. 614-619.
Karczewicz, Marta, et al., "Post-filter with reduced delay requirements," Telecommunication Standardization Sector, International Telecommunication Union, Qualcomm Inc., Jan. 2009, 4 pages.
"Joint Call for Proposals on Video Compression Technology," ITU-T Q6/16 Visual Coding, ISO/IEC JTC1/SC29/WG11 Coding of Moving Pictures and Audio, Jan. 17-22, 2010, 19 pages.

(Continued)

*Primary Examiner* — Jamie Atala
*Assistant Examiner* — Nguyen Truong
(74) *Attorney, Agent, or Firm* — Fish & Richardson P.C.

(57) ABSTRACT

Encoding video data that includes a frame includes: generating a reconstructed frame from compressed data for the frame, partitioning at least some pixels of the reconstructed frame into a plurality of segments of one or more pixels, based at least in part on pattern information for individual pixels, and generating respective filter information for each of one or more of the plurality of segments. Encoded video data is generated that includes the compressed data for the frame and the generated filter information.

16 Claims, 14 Drawing Sheets

(56) References Cited

OTHER PUBLICATIONS

Maenpaa, Topi, "The Local Binary Pattern Approach to Texture Analysis—Extensions and Applications," Academic Dissertation, University of Oulu, Aug. 8, 2003, 76 pages.

Chong, In Suk, et al., "Encoder Complexity Analysis and Performance Report on Adaptive Loop Filter," Joint Collaborative Team on Video Coding (JCT-VC) of ITU-T SG16 WP3 and ISO/IEC JTC1/SC29/WG11, Jul. 21-28, 2010, 5 pages.

Ojala, Timo, et al., "A Comparitive Study of Texture Measures with Classification Based on Feature Distrubutions," Pattern Recognition, vol. 29, No. 1, 1996, pp. 51-59.

Karczewicz, Marta, et al., "Post-Filter Applicability to Intra Coding," ITU-Telecommunications Standardization Sector, Study Group 16, Question 6, Video Coding Experts Group (VCEG), Jan. 12, 2008, 2 pages.

Karczewicz, Marta, et al., "Post-Filter Sei Message Extensions," ITU-Telecommunications Standardization Sector, Study Group 16, Question 6, Video Coding Experts Group (VCEG), Jul. 16-18, 2008, 3 pages.

International Search Report and Written Opinion of the International Searching Authority issued in International Application No. PCT/CA2011/050446 on Apr. 17, 2012; 9 pages.

International Preliminary Report on Patentability under Chapter I issued in Interantional Application No. PCT/CA2011/050446 on Jan. 30, 2014; 7 pages.

C-M Fu et al: "CE8 Subtest3: Picture Quadtree Adaptive Offset", No. JCTVC-D122, Jan. 15, 2011, XP030008162.

Maenpaa T et al: "Multiresolution gray-scale and rotation invariant texture classification with local binary patterns", IEEE Transactions on Pattern Analysis and Machine Intelligence, IEEE Computer Society, USA, vol. 24, No. 7, Jul. 1, 2002, pp. 971-987, XP011094543.

European Search Report in European Application No. 11869741.6, dated Mar. 27, 2015, 8 pages.

Office Action issued in Chinese Application No. 201180073589.2 on Jun. 17, 2016.

Communication Pursuant to Article 94(3) EPC issued in European Application No. 11869741.6, dated Jul. 28, 2016.

\* cited by examiner

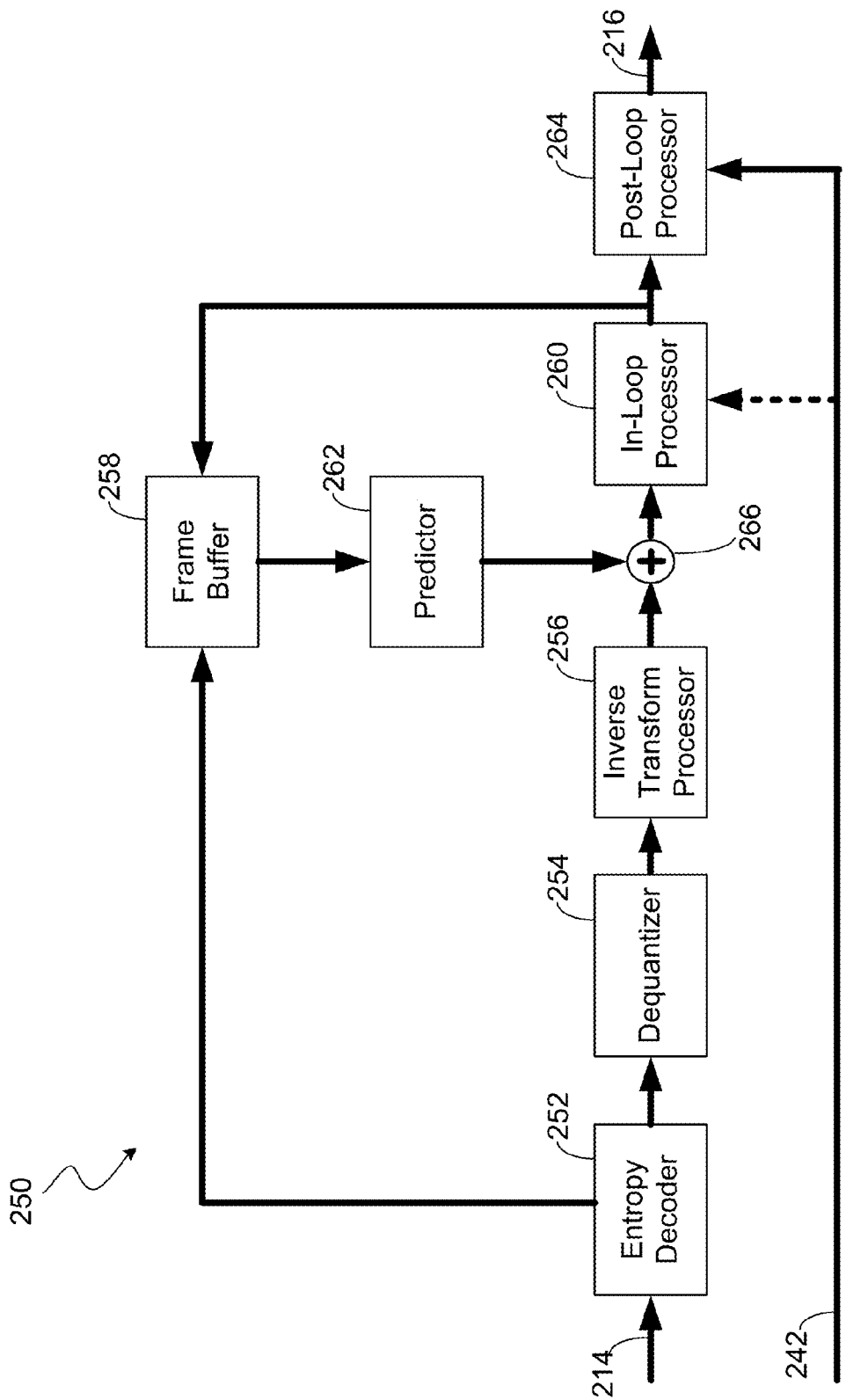

ADAPTIVE FILTERING BASED ON PATTERN INFORMATION

FIELD

The present application generally relates to coding and decoding video data, and in particular to techniques for adaptive filtering based on pattern information.

BACKGROUND

Some standards for encoding and decoding videos (e.g., ITU-T H.264/AVC video coding standard) use block-based coding processes. In these processes, to compress a video sequence, which consists of several frames of pictures, a frame is divided into blocks (e.g., 4×4, 8×8, 16×16, 32×32, or 64×64 blocks of pixel data). In this way, the task of encoding the whole video sequence is broken down into encoding each block, where blocks within a frame are encoded in a certain order (e.g., raster order). The process of encoding a block includes performing a transform (e.g., the discrete cosine transform (DCT)). In many cases, the data being transformed is not the actual pixel data, but is residual data following a prediction operation. For example, to encode a particular block of pixels (called the "current block"), a prediction of the same size (called the "reference block") is derived based on reconstruction of a block that was previously encoded. The reference block can come from a different frame (called "inter prediction") or the same frame (called "intra prediction"). The reconstruction involves decoding previously encoded blocks, which are then used to predict other blocks. Decoding operations that affect prediction are performed at both the decoder and the encoder, within what is called a "coding loop." Additional operations can optionally be performed by the decoder after the coding loop, including what is called "post-filtering" or "post-loop filtering." For example, post-filtering can include application of a deblocking filter. The deblocking process mitigates artifacts in the reconstructed video caused by the blocks (e.g., near block boundaries), and can involve filtering within the coding loop, outside the coding loop, or both. Frame-based adaptive post-filtering can be included after the deblocking process to further improve the reconstruction quality by reducing quantization noise. Filtering based on characteristics of the video data is called "adaptive" filtering.

DESCRIPTION OF DRAWINGS

FIG. 2B is a block diagram of an example video decoder.

Figure 5B:
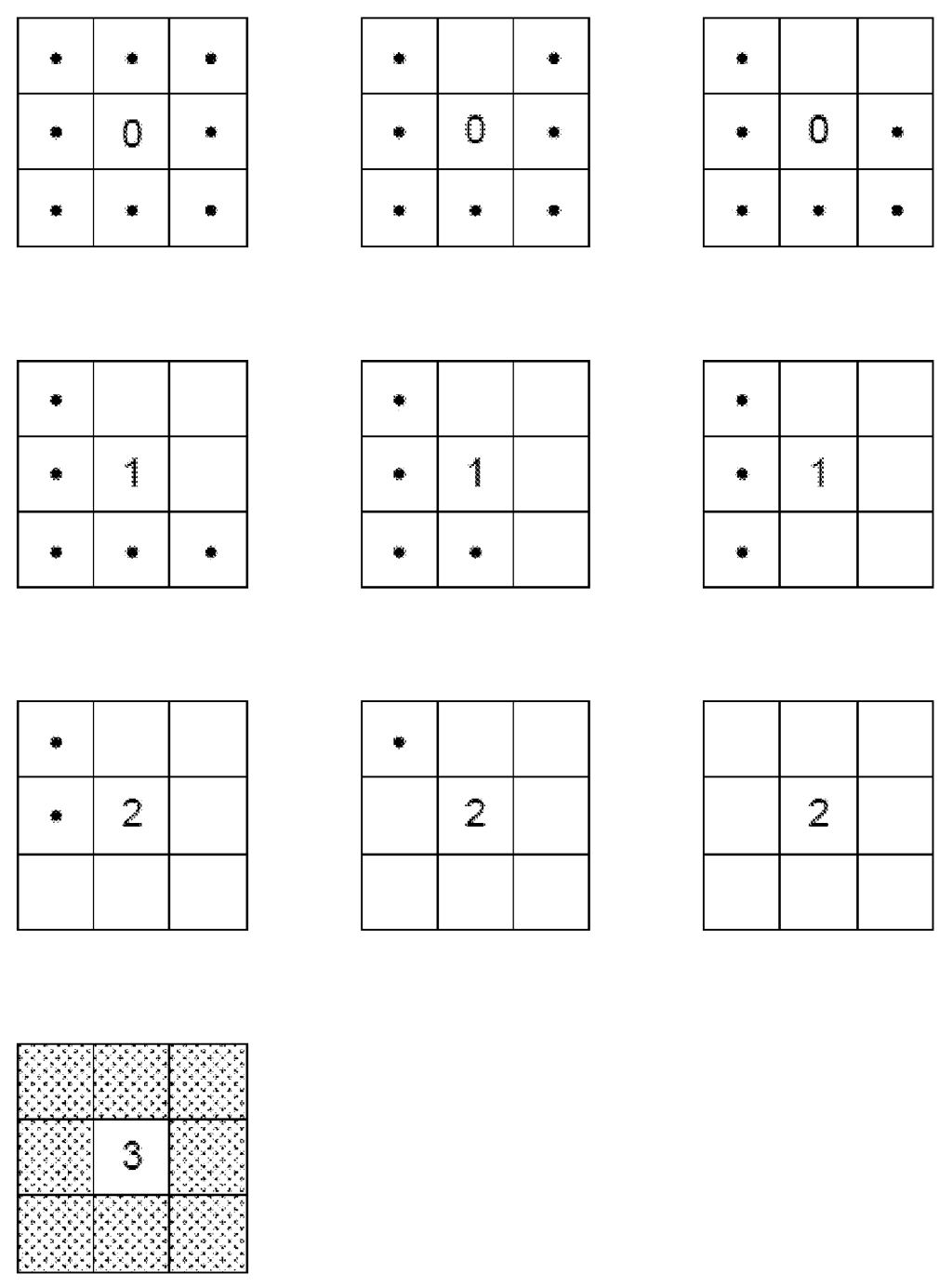

FIGS. 5A-5C are schematic diagrams of example patterns associated with corresponding labels.

DESCRIPTION

Figure 1:
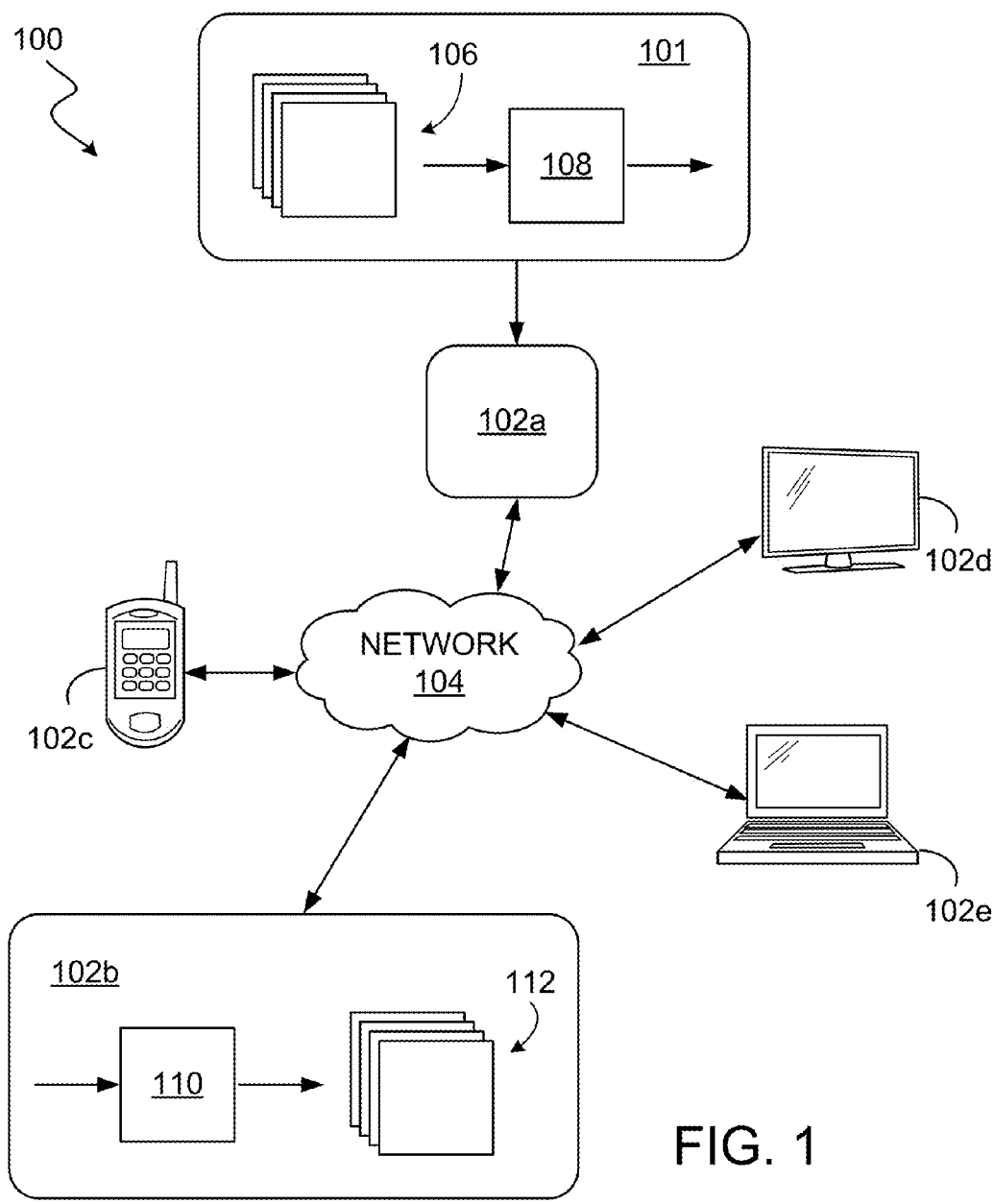
FIG. 1 is a block diagram of an example communication system.

The filtering techniques described herein can be applied to video data including data that is compressed for communication or storage and decompressed by any of a variety of devices. FIG. 1 shows an example system 100 for communicating data, including video, or other media data, between one or more nodes 101, 102a-102e connected over a network 104. In this example, a node 101 receives a sequence of frames 106 from one or more sources (not shown) such as a video camera or a video stored in a storage medium, or any other source that can detect, derive, capture, store or record visual information such as video or images. In some implementations, the sources may be in communication with the node 101, or may be a part of the node 101. The node 101 includes an encoder module 108 that encodes the frames 106 to generate a stream or file of encoded video data. The node 101 can be configured to generate filters using the techniques described herein, which can be specified by filter information included in the stream or file, for use when the encoded video data is being decoded. In this example, the encoded video data is provided to a node 102a coupled to the network 104. Alternatively, the node 101 may itself be coupled to the network 104, or the encoded video data may also or alternatively be stored locally for later transmission or output, such as in a non-volatile memory or other storage medium.

The node 102a transmits the encoded video data (e.g., as a stream or a file) to any of a variety of other nodes 102b-102e (e.g., a mobile device, a television, a computer, etc.) coupled to the network 104. The node 102a can include a transmitter configured to optionally perform additional encoding (e.g., channel coding such as forward error-correction coding) and to modulate the data onto signals to be transmitted over the network 104. The node 102b receives and demodulates the signals from the network 104 to recover the encoded video data. The node 102b includes a decoder module 110 that decodes the encoded video data and generates a sequence of reconstructed frames 112. The reconstruction process may include adaptive filtering that is performed by applying the filters specified by the filter information transmitted with the encoded video data. In some implementations, the node 102b may include a display for rendering the reconstructed frames 112. The node 102b may include a storage medium to store the encoded video data for later decoding including at a time when the node 102b is not coupled to the network 104.

The network 104 may include any number of networks interconnected with each other. The network 104 may include any type and/or form of network(s) including any of the following: a wide area network (such as the Internet), a local area network, a telecommunications network, a data communication network, a computer network, a wireless network, a wireline network, a point-to-point network, and a broadcast network. The network may include any number of repeaters, appliances, devices, servers, storage media and queues.

In the description that follows, example embodiments of the filtering techniques are described with reference to two-dimensional video coding/decoding, however, the filtering techniques may also be applicable to video coding/decoding that includes additional views or dimensions, including multiview video coding (MVC) and three-dimensional (3D) video, or extensions of video coding/decoding schemes such as scalable video coding (SVC).

In the description that follows, the terms picture, frame, and slice are used somewhat interchangeably. For example, in the case of the H.264 standard, a frame may contain one or more slices. It will also be appreciated that certain encoding/decoding operations are performed on a frame-by-frame basis and some are performed on a slice-by-slice basis, depending on the particular requirements of the applicable video coding standard. In any particular embodiment, the applicable video coding standard may determine whether the operations described below are performed in connection with frames and/or slices, as the case may be.

Figure 2A:
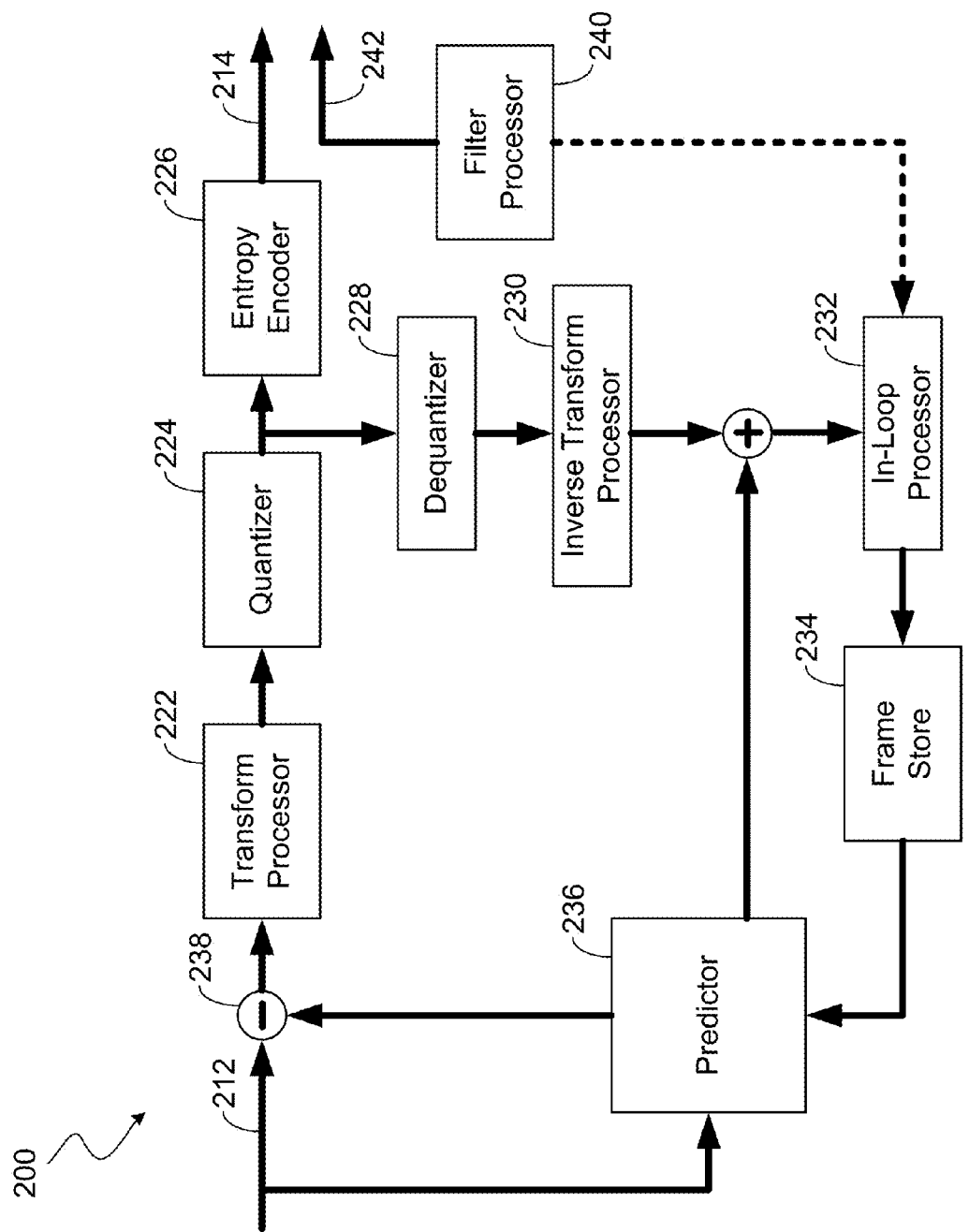
FIG. 2A is a block diagram of an example video encoder.

Reference is now made to FIG. 2A, which shows a block diagram of an encoder 200 for encoding video. Reference is also made to FIG. 2B, which shows a block diagram of a decoder 250 for decoding video. It will be appreciated that the encoder 200 and decoder 250 described herein may each be implemented on an application-specific or general purpose computing device, containing one or more processing elements and memory. The operations performed by the encoder 200 or decoder 250 (e.g., using various "processor" modules) may be implemented by way of application-specific integrated circuit, for example, or by way of stored program instructions executable by a general purpose processor. The device may include additional software, including, for example, an operating system for controlling basic device functions.

The encoder 200 receives input data 212 from a source (e.g., a video source) and produces encoded video data 214 and filter information 242, which may be supplied together in a single bitstream. The decoder 250 receives the bitstream containing the encoded video data 214 and filter information 242 (as input data for the decoder 250) and outputs a decoded video frame 216. The encoder 200 and decoder 250 may be configured to operate in conformance with a number of video compression standards. For example, the encoder 200 and decoder 250 may be H.264/AVC compliant. In other embodiments, the encoder 200 and decoder 250 may conform to other video compression standards, including evolutions of the H.264/AVC standard such as the High Efficiency Video Coding (HEVC) standard.

The encoder 200 includes a transform processor 222, a quantizer 224, and an entropy encoder 226. The input data 212 includes frames of spatial domain data where each frame is organized, for example, as blocks of pixel data, which may further be organized as "macroblocks" or "coding units" that are made up of multiple blocks of pixel data. The blocks of pixel data each comprise a two-dimensional array of pixel data where each pixel represents at least one value (e.g., a luminance value that represents an overall intensity, or a chrominance value that includes color information). The transform processor 222 performs a transform upon the spatial domain data. In particular, the transform processor 222 applies a block-based transform to convert spatial domain data (in a spatial domain with dimensions x and y) to spectral components in a transform domain (with dimensions $f_x$ and $f_y$ that represent spatial frequencies). For example, in many embodiments a discrete cosine transform (DCT) is used. Other transforms, such as a discrete sine transform or others may be used in some instances. The block-based transform is performed on a macroblock or sub-block basis, depending on the size of the macroblocks. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes (e.g., 16×16, 32×32, or 64×64 blocks, or rectangular blocks having different numbers of pixels in the x and y dimensions in the spatial domain, and different numbers of coefficients in the $f_x$ and $f_y$ dimensions in the transform domain). The block of transform domain coefficients is quantized by the quantizer 224. The quantized coefficients and associated information are then encoded by the entropy encoder 226.

A predictor 236 provides a reference block for performing prediction by subtracting the reference block from a current block of the input data 212 being encoded. The predictor 236 includes a module to determine the appropriate coding mode, for example, whether the frame/slice being encoded is of I, P, or B type. Intra-coded frames/slices (i.e., type I) are encoded without reference to other frames/slices. In other words, they do not employ temporal prediction. However intra-coded frames do rely upon spatial prediction within the frame/slice. That is, when encoding a particular block the data in the block may be compared to the data of nearby pixels within blocks already encoded for that frame/slice to find a similar reference block. Using a difference processor 238 (e.g., subtraction of respective pixel values), the pixel data of the reference block is subtracted from the pixel data of the current block to generate a block of residual data. The transform processor 222 then converts the residual data into coefficients in the transform domain. H.264, for example, prescribes nine spatial prediction modes for 4×4 transform blocks, and HEVC prescribes additional spatial prediction modes. In some embodiments, multiple of the modes may be used to independently process a block, and then rate-distortion optimization is used to select the best mode.

Motion prediction/compensation enables the encoder 200 to take advantage of temporal prediction. Accordingly, the encoder 200 has a feedback loop that includes a de-quantizer 228, an inverse transform processor 230, and an in-loop processor 232. These elements mirror in-loop portions of the decoding process performed by the decoder 250 to reproduce the frame/slice before any post-loop processing is applied. A frame store 234 is used to store the reproduced frames. In this manner, the motion prediction is based on what will be the reconstructed frames at the decoder 250 and not on the original frames, which may differ from the reconstructed frames due to the lossy compression involved in encoding/decoding. When performing motion prediction/compensation, the predictor 236 uses the frames/slices stored in the frame store 234 as source frames/slices for comparison to a current frame for the purpose of identifying similar blocks. Accordingly, for blocks to which motion prediction is applied, the "source data" which the transform processor 222 encodes is the residual data that comes out of the motion prediction process. For example, it may include information regarding the reference frame, a spatial displacement or "motion vector," and residual pixel data that represents the differences (if any) between the reference block and the current block. Information regarding the reference frame and/or motion vector is not necessarily processed by the transform processor 222 and/or quantizer 224, but instead may be supplied to the entropy encoder 226 for encoding as part of the bitstream along with the quantized coefficients.

The encoder 200 also includes a filter processor 240. The filter processor 240 processes the video data that is being encoded by the encoder 200 to determine parameters for filters to be applied to the reconstructed video data by the decoder 250. The filter processor 240 generates filter information 242 from which the parameters for the filters (e.g., coefficients for Wiener filters) can be extracted. The filter processor 240 is configured to analyze pattern information characterizing the video data to be filtered to enable improved filtering, as described in more detail below with reference to FIG. 3 and FIGS. 4A-4D. The filter information 242 can be included in the same compressed stream as the encoded video data 214, and any of a variety of techniques can be used to associate particular filter information with corresponding video data to be filtered. In some implementations, the filter information 242 is provided for post-filtering (by a post-loop processor) at the decoder 250. Alternatively, the filter information can be provided for in-loop filtering (by an in-loop processor), or for both in-loop and post filtering. Optionally, if in-loop filtering is being performed, the filter processor 240 provides filter information to the in-loop processor 232.

The decoder 250 includes an entropy decoder 252, dequantizer 254, inverse transform processor 256, an in-loop processor 260, and a post-loop processor 264. A frame buffer 258 supplies reconstructed frames for use by a predictor 262 in applying spatial prediction and motion compensation. An addition processor 266 represents the operation of recovering the video data for a particular reconstructed block to be supplied to the in-loop processor 260 from a previously decoded reference block from the predictor 262 and a decoded residual block from the inverse transform processor 256.

The encoded video data 214 is received and decoded by the entropy decoder 252 to recover the quantized coefficients. The filter information 242 is received and provided to the post-loop processor 264 for applying the appropriate post-filtering to a reconstructed frame provided by the in-loop processor 260 to generate the decoded video frame 216 that is output from the decoder 250. Side information may also be recovered during the entropy decoding process, some of which may be supplied to the motion compensation loop for use in motion compensation, if applicable. For example, the entropy decoder 252 may recover motion vectors and/or reference frame information for inter-coded macroblocks.

The quantized coefficients recovered by the entropy decoder 252 are dequantized by the dequantizer 254 to produce the transform domain coefficients, which are then subjected to an inverse transform by the inverse transform processor 256 to recreate "video data." In some cases, such as with an intra-coded macroblock, the recreated "video data" is the residual data for use in spatial compensation relative to a previously decoded block within the frame. The decoder 250 generates the video data from the residual data and pixel data from a previously decoded block. In other cases, such as inter-coded macroblocks, the recreated "video data" from the inverse transform processor 256 is the residual data for use in motion compensation relative to a reference block from a different frame.

When performing motion compensation, the predictor 262 locates a reference block within the frame buffer 258 specified for a particular inter-coded macroblock. It does so based on the reference frame information and motion vector specified for the inter-coded macroblock. It then supplies the reference block pixel data for combination with the residual data to arrive at the recreated video data for that macroblock.

In-loop processing and post-loop processing are optionally applied to a reconstructed frame/slice by the in-loop processor 260 and post-loop processor 264, respectively. For example, the in-loop processing can include deblocking operations, and the post-loop processing can include filtering such as the adaptive pattern-based filtering described in more detail with reference to FIG. 3 and FIGS. 4A-4D. Certain types of in-loop and post-loop processing are optional and in some cases the in-loop and post-loop processors operate in a bypass mode to provide reconstructed data without any processing (e.g., deblocking may not be necessary after spatial compensation). After in-loop and post-loop processing, the frame/slice is output as the decoded video frame 216, for example for display on a display device. It will be understood that the video playback machine, such as a computer, set-top box, DVD or Blu-Ray player, and/or mobile handheld device, may buffer decoded frames in a memory prior to display on an output device.

An implementation of the adaptive pattern-based filtering that can be applied in post-filtering by the post-loop processor 264, for example, is based on Wiener filters. The filter processor 240 can be configured to provide coefficients in the filter information 242 that define a particular Wiener filter to be applied to a particular segment of a reconstructed video frame. The filter processor 240 can also be configured to perform the segmentation to determine the segments that are to be filtered, and which filters are to be applied to which segments. For example the filter processor 240 partitions a reconstructed video frame into non-overlapping segments, and for each segment an adaptive filter is determined to improve a particular characteristic (e.g., to reduce quantization noise).

A Wiener filter can be defined with respect to pixel locations in a two-dimensional space $\{(x, y); x \in X, y \in Y\}$, where $S_{x,y}$ represents the value of a pixel located at $(x, y)$ in an original frame S (e.g., in the input data 212), and $R_{x,y}$ represents the value of the same pixel in a reconstructed frame R (e.g., provided to the post-loop processor 264). The Wiener filter can be defined by a set of coefficients $h=\{h_{i,j}; i, j \in [-K, K]\}$ that minimize a mean square error (MSE) denoted by E, where E is given by the following equation:

$$E = \sum_{x \in X} \sum_{y \in Y} \left[ S_{x,y} - \sum_{i=-K}^{K} \sum_{j=-K}^{K} h_{i,j} R_{x+i, y+j} \right]^2$$

By setting the derivative of equation (1) to zero with respect to the coefficients h, the Wiener filter coefficients can be determined by solving the Wiener-Hopf equations given by the following equation (2):

$$C_R \cdot F = C_{SR}$$

where $C_R$ is the autocorrelation matrix of R, $C_{SR}$ is the cross-correlation between S and R, and $F=\{h_{-K,-K}, h_{-K,-K+1}, \ldots, h_{K,K}\}$ is a vector of the filter coefficients.

By applying the Wiener filter defined by h to the reconstructed frame R, the quality of the reconstruction is improved as measured by MSE. However, global linear filtering using a single Wiener filter may not be optimal or effective for reducing error (e.g., quantization error) associated with the local details in the reconstructed frame R when the original frame S represents an image with many boundaries or with complex textures, for example. A reason for this local non-optimality is that an optimality condition defined by minimizing the MSE given by the equation above for E assumes the statistics of the input frame are stationary; however, this assumption may not hold for many frames of typical video sequences.

One aspect of a technique for addressing this non-stationary nature of video frames, is to generate and apply multiple adaptive filters, M+1 filters $\{h^m, m \in \{0, 1, \ldots, M\}\}$, to respective segments of a frame instead of a single filter to the entire frame. The segmentation can be determined based on multiple types of information associated with the pixels in the frame being segmented. For example, one type of information can be used to perform an initial segmentation, and another type of information can be used to perform a subsequent segmentation of one or more segments formed from the initial segmentation.

One type of information that can be used for segmentation is variation information, which can be expressed as a two-dimensional function v(x, y) that quantifies a local variation measurement (e.g., using a spatial differential operator such as a Laplacian operator) over a predefined region, such as a . . . pixel region centred on (x, y). Thus, variation information characterizes a degree to which the magnitudes of pixel values (e.g., luminance values) vary in a local region surrounding a given pixel.

Another type of information that can be used for segmentation is pattern information, which can be expressed as a two-dimensional pattern function p(x, y) that identifies a local spatial pattern and is able to distinguish between different spatial characteristics of an image. For example, the pattern function can distinguish between different texture characteristics. In some implementations, the pattern function can distinguish between different orientation characteristics. Alternatively, in some implementations, the pattern function is rotation-invariant. Pattern information is useful, for example, to separate the multiple patterns that may exist in some complicated images into different segments. Filters determined based on variation information alone may exhibit some difference in their magnitudes, but may be substantially similar in their shape. Whereas the use of pattern information, alone or in combination with variation information, enables the filter characteristics such as filter shape to be customized to particular patterns within the image of the frame. Pattern information can in some cases also enable a fewer number of filters to be used allowing simpler filter implementation, as demonstrated below in results from an example implementation. One example of a pattern function that can be used to generate the pattern information is a function sometimes used for texture classification called the Local Binary Pattern (LBP), as described in more detail below.

Figure 3:
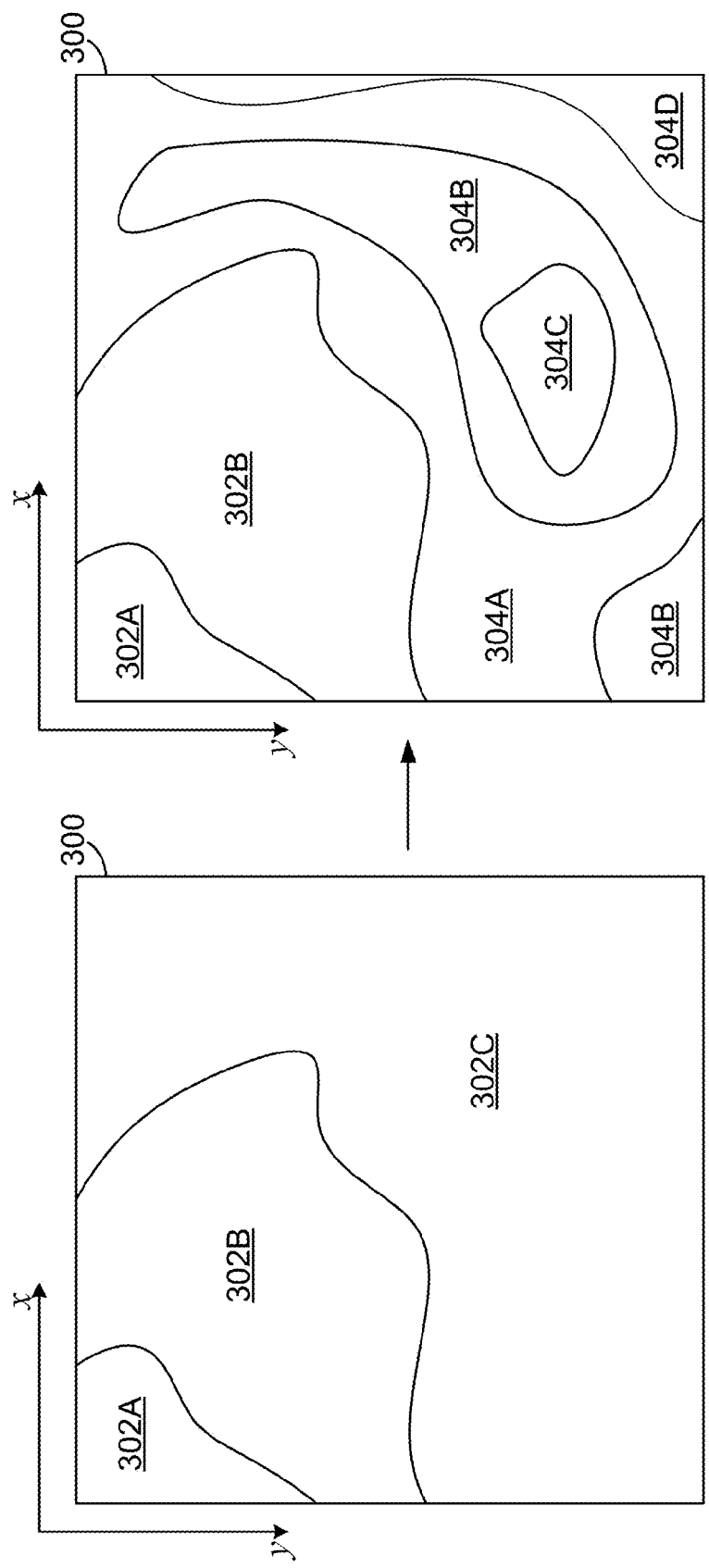
FIG. 3 is a schematic diagram illustrating an example procedure for determining segments and filters based on pattern information.

Reference is now made to FIG. 3, which shows a schematic diagram illustrating an example procedure for segmenting a frame and determining filter information (e.g., using the filter processor 240), during an encoding procedure, to be used for filtering during a decoding procedure. A reconstructed video frame 300 (denoted by R in the equations below) is partitioned into non-overlapping segments with one or more of the segments being determined based on pattern information. In this example procedure, the filter processor 240 performs two stages of segmentation. In the first stage, the filter processor 240 partitions pixels of the reconstructed frame 300 into multiple sets 302A-302C of pixels based at least in part on variation information for individual pixels. Pixels that have respective values of the variation information within different ones of multiple ranges are assigned to different respective ones of the sets 302A-302C, as described in more detail below. In the second stage, the filter processor 240 further partitions the pixels of the frame 300 within selected one(s) of the sets 302A-302C into multiple subsets 304A-304D of pixels based at least in part on pattern information for individual pixels in the selected set(s), as described in more detail below. In this example, the set 302C is selected for further partitioning based on pattern information in the second stage. The sets and subsets of pixels represent labelled segments, which are not necessarily contiguous within the frame 300. For example, subset 304B includes two regions of the frame 300 in this example, which are both considered to be part of the same segment of the frame to which the same filter will be applied.

The filter processor 240 calculates the variation information v(x, y) for a particular pixel at (x, y) as a Laplacian function v(x, y)=l(x, y) over a (2K+1)×(2K+1) pixel region centred on (x, y), where the Laplacian l(x, y) is defined as:

$$\ell(x, y) = \frac{1}{(2K+1)^2} \sum_{i=-K}^{K} \sum_{j=-K}^{K} |4R(x+i, y+j) - R(x+i-1, y+j) - R(x+i+1, y+j) - \ldots - R(x+i, y+j-1) - R(x+i, y+j+1)|$$

where R(x,y) is a pixel value (e.g., luminance) at the pixel location (x, y) of the reconstructed frame R.

When segmenting the reconstructed frame R based on the variation information in the first stage, the filter processor 240 partitions the pixels in R into different sets, each identified by a different label, according to an M+1-label field $L^M$ by thresholding the range of values of the Laplacian l(x, y) to define M+1 sets. In the following example, M=2 and there are two threshold values $t_\alpha$ and $t_\beta$ that define 3 sets. A pixel located at (x, y) is partitioned into one of the 3 sets according to the following:

$$L^M(x, y) = \begin{cases} 0, & \text{if } \ell(x, y) < t_\beta \\ 1, & \text{if } t_\beta < \ell(x, y) < t_\alpha \\ ?, & \text{if } \ell(x, y) > t_\alpha \end{cases}$$

where $L^M(x, y)$ is a label identifying a corresponding one of the sets. The two label states associated with the M+1-label field have labels "0" and "1". A first set of pixels is identified by the label "0", a second set of pixels is identified by the label "1", and a third set of pixels, which will undergo additional partitioning in the second stage, is identified by the label "?" (as the "undetermined" M+1$^{st}$ label state). The values of the thresholds $t_\alpha$ and $t_\beta$ can be calculated according to characteristics of the frame R or the video sequence containing the frame R. In this example, the thresholds $t_\alpha$ and $t_\beta$ are functions of α and β respectively, and α and β are dependent on the average quantization parameter (QP) associated with a portion of the frame R. The value of M=2 may be used, which provides a good tradeoff between complexity and performance.

For the set of pixels with the undetermined label state {R(x, y)|$L^M$(x, y)=?}, a pattern function is used to partition the pixels into subsets based on pattern information for each pixel. FIGS. 4A-4D illustrate example arrangements of reference locations that can be used to determine spatial patterns using a pattern function. A pattern function calculates pattern information for a particular pixel based at least in part on intensity values of pixels in a neighborhood surrounding (but not necessarily adjacent to) the particular pixel, compared to an intensity value of the particular pixel. The pixel intensity value can be a luminance value or a grayscale value, for example. The pattern information is calculated based on whether the intensity of the center pixel is larger or smaller than intensities associated with each of the reference locations. The calculated pattern information for the particular pixel identifies which of multiple types of spatial patterns surround that pixel by assigning each pattern type a different value. The pattern types (also called "texture primitives") can include, for example, "spot," "corner," "edge," "line end," "flat."

Figure 4A:
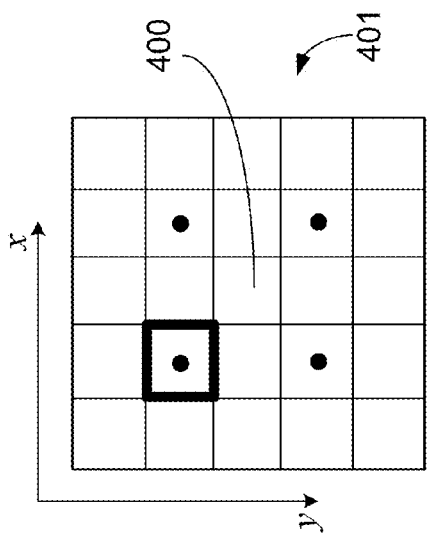
FIGS. 4A-4D are schematic diagrams of example pattern information.

FIG. 4A shows a first arrangement 401 of reference locations (shown as black dots) surrounding a center pixel 400. The intensity value of the center pixel is compared to each of these four pixels, in turn, and based on the results of the comparisons (whether the center pixel intensity is larger or smaller than the intensity associated with the reference location) a pattern type is identified. In this example, each reference location is in the center of a pixel, and is therefore represented by the intensity value of that pixel. So, the intensity value associated with the upper left reference location, for example, is the intensity value of the underlying pixel (shown in thick outline).

Figure 4B:
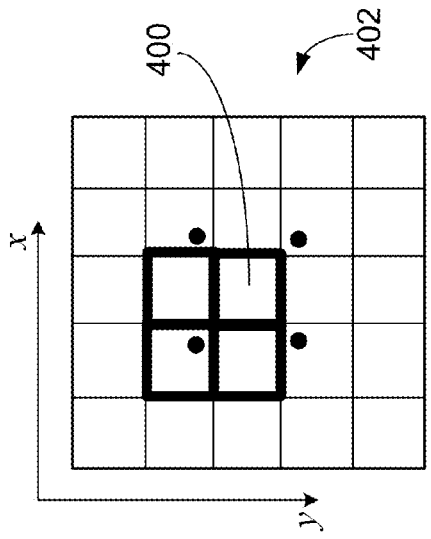

FIG. 4B shows a second arrangement 402 of reference locations surrounding the center pixel 400. These reference locations are closer to the center pixel 400, so the intensity value associated with each reference location is determined based on combining intensity values of other pixels (e.g., interpolating using a weighted combination). In this example, the intensity value associated with the upper left reference location is a weighted combination of the intensity values of the four pixels (shown in thick outline) in proximity to the reference location (which for this arrangement 402 includes the center pixel 400).

Figure 4C:
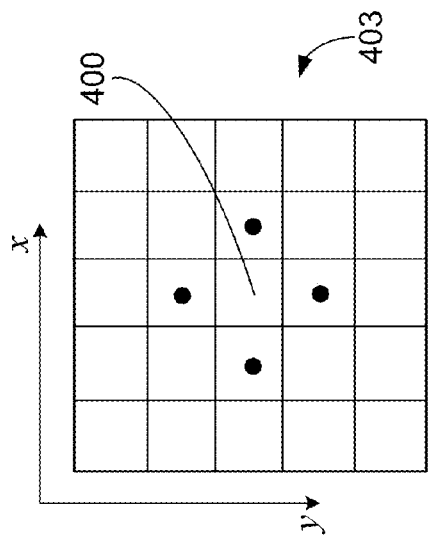
Figure 4D:
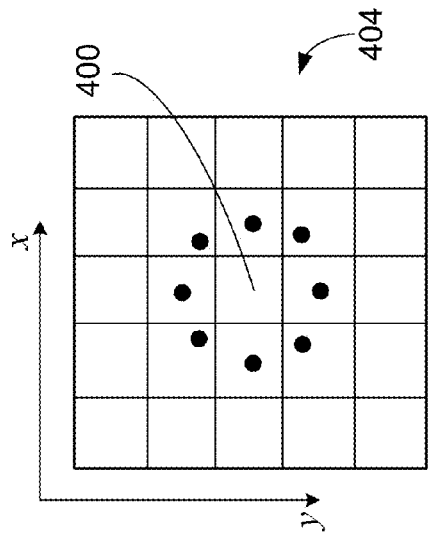

FIG. 4C shows a third arrangement 403 of reference locations surrounding the center pixel 400. This arrangement 403 is used in the simplified 4-neighbor LBP example described below. FIG. 4D shows a fourth arrangement 404 of reference locations surrounding the center pixel 400. This arrangement 404 is used in the simplified 8-neighbor LBP example described below.

In the second stage, pixels are partitioned into N subsets, with each subset being identified by a label $L^N(x, y)$ corresponding to a label state defined according to a pattern function. In this example, the pattern function is an LBP function $LBP_P^N(x, y)$ that returns one of N possible values (called an "LBP index") as a function of surrounding pixel intensity values relative to the intensity at a given center pixel location (x, y). The LBP index returned by the LBP function is used to assign a pixel to a labelled subset as follows:

$$L^N(x,y) = LBP_P^N(x,y)$$

where P is a parameter associated with the LBP function that determines how many reference locations will be used to characterize the pattern identified by an LBP index value.

An example of the way an LBP function determines an LBP index value for a given center pixel location (x, y) is as follows.

$$LBP_P(x, y) = \sum_{p=0}^{P-1} s(g_p - g_c) 2^p$$

where $g_c$ is the grayscale value corresponding to the center pixel at (x, y), $g_p$ (for p=0, ..., P−1) is the grayscale value of one of the P reference locations based on neighboring pixels surrounding (but not necessarily adjacent to) the center pixel at (x, y). The function s(•) is a sign function that returns the value 1 or 0, depending on the sign of its argument:

$$s(g_p - g_c) = \begin{cases} 1, & g_p - g_c \geq 0 \\ 0, & g_p - g_c < 0 \end{cases}$$

Other types of LBP functions can also be used, and various operations can be used to change the number of LBP indices generated by a particular LBP function being used as the pattern function. For example, another type of LBP function is a rotation invariant LBP function denoted by $LBP_P^{riu}$, in which the indices generated by the $LBP_P(x, y)$ shown above are mapped into a smaller set of indices. For example, $LBP_P^{riu}$ can be defined as follows. For each LBP pattern shown in FIG. 5A, an arbitrary number of rotated shifts of its 8 neighboring pixels in either a clockwise or counter-clockwise direction will not change the label state of the LBP pattern. For instance, for the LBP pattern labeled as 7 in FIG. 5A, after a rotated shift of its neighboring pixels, no matter where the black dot is finally located, the resulting pattern is always labeled as 7.

Figure 5A:
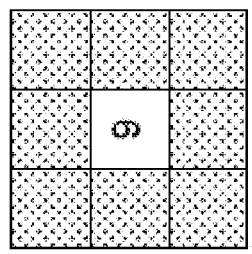

The following is an example of the pattern function $LBP_P^N(x, y)$ that is based on a simplified 8-neighbor LBP function, using the rotation invariant LBP function $LBP_P^{riu}$ with P=8. For each reconstructed frame R, the pattern function $LBP_P^N(x, y)$ is defined according to two possible configurations, depending on a result of comparing a particular ratio to a threshold thr as follows:

$$LBP_P^N = \begin{cases} LBP_{P=8}^{riu}, & \text{if } \frac{\text{size}(R | L^M = ?)}{\text{size}(R | L^M = 0 \cup L^M = 1)} \geq thr \\ \text{merge}(LBP_{P=8}^{riu}), & \text{otherwise} \end{cases}$$

where merge(•) is a merge operator that merges some labels states based on similarity of their patterns. The ratio's numerator size($R|L^M$=?) is the number of pixels in the frame R that have a label state $L^M$ (for the M+1-label field) that is the undetermined state "?". The ratio's denominator size ($R|L^M$=0∪$L^M$=1) is the number of pixels in the frame R that have a label state $L^M$ that is any of the determined states, "0" or "1" for M=2. In this example, the merge operator merge (•) combines some label states that have close LBP indices into groups, and assigns a new label to each group. For P=8, the original label states of the rotation invariant LBP function are shown in FIG. 5A, where 9 of the label states (with numerical labels 0-8) are illustrated by showing the 8 pixels surrounding the center pixel (with a dot representing a result of the grayscale comparison) and a corresponding numerical label in the center. The other label states are represented by numerical label of 9, for a total of 10 original labels (with N=10). The merged label states are shown in FIG. 5B. Original label states 0-2 are merged into a group with a new label 0. Original label states 3-5 are merged into a group with a new label 1. Original label states 6-8 are merged into a group with a new label 2. Original label states 9 are merged into a group with a new label 3, for a total of 4 merged labels (with N=4).

The value of the threshold thr can be determined according to characteristics of test video sequences by an offline training process. In an example offline training process, for each test video sequence, an average (over the frames of the sequence) of a ratio ($\gamma_t$) of the number of undetermined state pixels to the number of determined state pixels is calculated. Additionally, for each test video sequence, filters are determined and applied based on both of the two LBP configurations: $LBP_P^{riu}$ and merge($LBP_P^{riu}$), respectively. For each LBP configuration, the rate distortion (RD) cost associated with that configuration can be calculated. For each test video sequence, the LBP configuration that leads to the lower RD cost is selected, to classify the video sequences as a "merged configuration sequence" if merge($LBP_P^{riu}$) leads to the lower RD cost, or a "non-merged configuration sequence" if $LBP_P^{riu}$ leads to the lower RD cost. For the group of merged configuration sequences, the average of their ratios $\gamma_t$ is calculated, and for the group of non-merged configuration sequences, the average of their ratios $\gamma_t$ is calculated. The threshold thr can be selected as the average of the two average values of $\gamma_t$ for the two groups corresponding to the two LBP configurations.

Although determining a threshold thr in an offline training process to be used to select an LBP configuration for online processing may not lead to a best selection for every sequence and every sequence frame, using a threshold thr determined in offline process may be helpful in the sense of saving the online processing cost. Alternatively, in some implementations, if selecting a best LBP configuration for every video frame is preferred, the online procedures can generate and apply both filters based on $LBP_P^{riu}$ and merge ($LBP_P^{riu}$) configurations and select the one with the lower RD cost to use to generate the encoded filter coefficients.

The use of the merge operator merge(•) is a tradeoff between preserving high performance (e.g., in terms of peak signal-to-noise ratio) of LBP techniques and achieving low complexity by reducing the number of subsets (N). While the use of the merge operator reduces the number of states N, the number of label states remains high enough for the labels states to provide adequate descriptive ability for increasing filter performance through segmentation. The complexity of the resulting post-processing can be reduced for small values of N because the process of generating each of the adaptive filters for the multiple (M+N) segments may be expensive. For example, generating the process of generating a filter for a segment can involve: populating an auto-correlation matrix; populating a cross-correlation matrix; and computing a solution to the Weiner-Hopf equations. As the number N is reduced, fewer filters are required, which leads to less computational complexity.

In this 8-neighbor LBP function example, the number of subsets N used for partitioning in the second stage is given by:

$$N = \begin{cases} 10, & \text{if } \frac{size(R \mid L^M = ?)}{size(R \mid L^M = 0 \cup L^M = 1)} \geq thr \\ 4, & \text{otherwise} \end{cases}$$

Figure 5C:
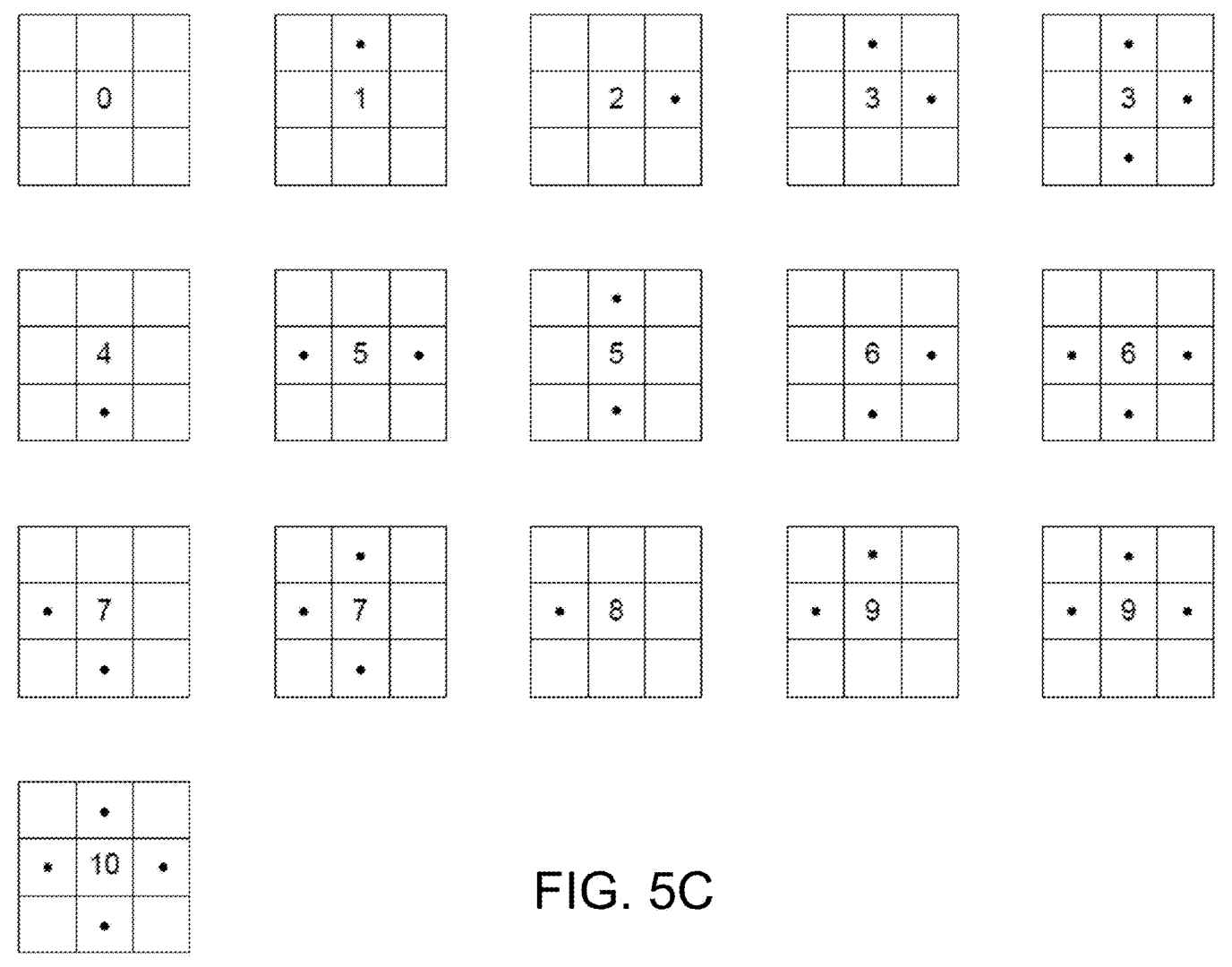

Other examples of pattern functions can use LBP functions in other ways. For example, the pattern function $LBP_P^N(x, y)$ can be based on a simplified 4-neighbor LBP function by setting $LBP_P^N$=merge($LBP_4$), which uses the non-rotation-invariant function $LBP_P(x, y)$ defined above with P=4, and uses N=11. FIG. 5C shows an example in which 16 original label states are merged into 11 label states.

A total of M+N filters can be determined, respectively, for each of the M+N segments, for example, by minimizing the following M+N MSE functions:

$$E^m = \sum_{(x,y) \in \Omega^m} \left[ S_{x,y}^m - \sum_{i=-K}^{K} \sum_{j=-K}^{K} h_{i,j}^m R_{x+i,y+j}^m \right]^2$$

$$E^n = \sum_{(x,y) \in \Omega^n} \left[ S_{x,y}^n - \sum_{i=-K}^{K} \sum_{j=-K}^{K} h_{i,j}^n R_{x+i,y+j}^n \right]^2$$

where $\Omega^m = \{(x, y) | L^M(x, y) = m\}$ is the set of pixel locations in the $m^{th}$ of M segments determined in first phase of segmentation, and $\Omega^n = \{(x, y) | L^N(x, y) = n\}$ is the set of pixel locations in the $n^{th}$ of N segments determined in the second phase of segmentation. For each of the M+N MSE functions, the minimization procedure includes calculating the derivative of each filter coefficient and setting those derivatives to zero, which yields a set of liner equations. These equations are known as the Wiener-Hopf equations. The solution to these equations yields a set of filter coefficients that is what we want to be used for adaptive filtering.

An example implementation of an adaptive filtering procedure based on pattern information for five 1080p test video sequences with 24 prediction frames is now described. The reconstruction performance of the implementation (method 1) was compared to a reference method (method 2), and the comparison results are shown in Table 1 and Table 2, respectively, corresponding to two different LBP types: a simplified 8-neighbor LBP and a simplified 4-neighbor LBP. The reference method does not use pattern information to generate filters, and uses 16 filters for each frame of each test video sequence. In the example comparison between the methods, the Wiener filters share the same structure: non-separable, 5×5-tap, without using coefficient symmetry. The quality metric used for the comparison is peak signal-to-noise ratio (PSNR), which is a metric typically used for assessing video quality.

TABLE 1

(simplified 8-neighbor LBP)

| Sequence (1080p, 24 P-frames) | Number of filters (method 2) | PSNR (dB), (method 2) | Number of Filters (method 1) | PSNR (dB), (method 1) |
| --- | --- | --- | --- | --- |
| ParkScene | 16 | 0.205 | 12 | 0.222 |
| Kimono | 16 | 0.220 | 6 | 0.208 |
| Basketball | 16 | 0.144 | 6 | 0.144 |
| Cactus | 16 | 0.112 | 12 | 0.159 |
| BQSquare | 16 | 0.183 | 12 | 0.220 |
| average | | 0.173 | | 0.191 |

TABLE 2

(simplified 4-neighbor LBP)

| Sequence (1080p, 24 P-frames) | Number of filters (method 2) | PSNR (dB), (method 2) | Number of Filters (method 1) | PSNR (dB), (method 1) |
| --- | --- | --- | --- | --- |
| ParkScene | 16 | 0.205 | 13 | 0.217 |
| Kimono | 16 | 0.220 | 13 | 0.216 |
| Basketball | 16 | 0.144 | 13 | 0.152 |
| Cactus | 16 | 0.112 | 13 | 0.138 |
| BQSquare | 16 | 0.183 | 13 | 0.239 |
| average | | 0.173 | | 0.192 |

The results from Table 1(2), show that method 1, on average, outperforms method 2 by 0.018(0.019) dB. In particular, for those sequences possessing complex patterns, such as Cactus, BQSquare, and ParkScene, method 1 results in a larger PSNR than method 2 for both LBP types. Additionally, method 1 uses fewer filters than method 2. Since the number of filters can determine the complexity of adaptive post-filtering, method 1 enables a potentially simpler filter implementation.

Figure 6A:
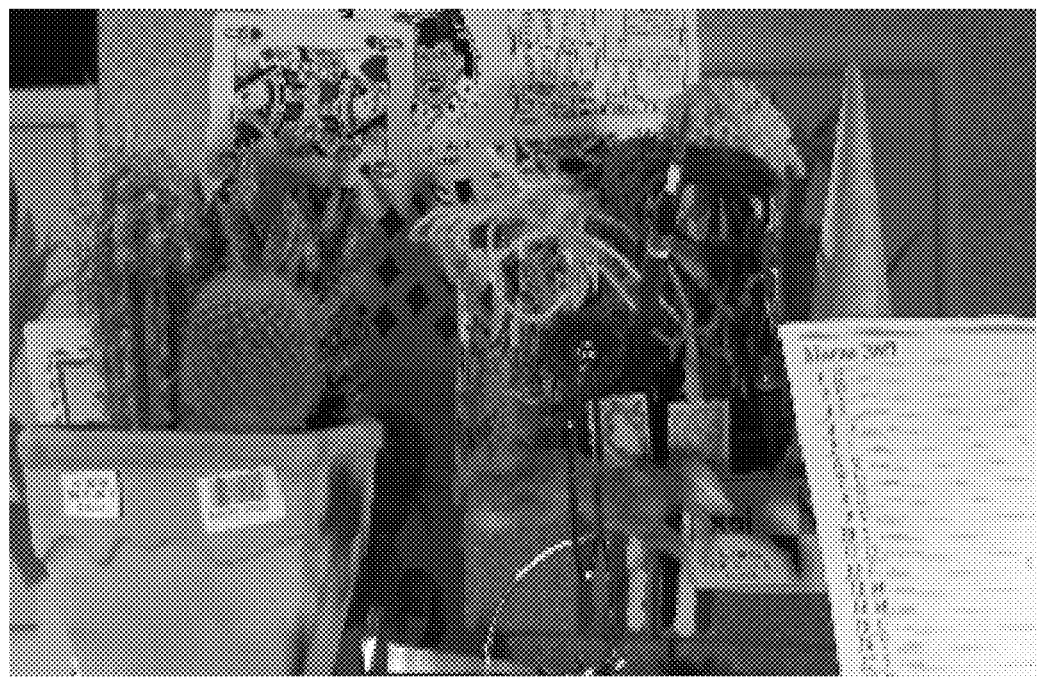
FIG. 6A is an example image from a reconstructed frame of a test video sequence.
Figure 6B:
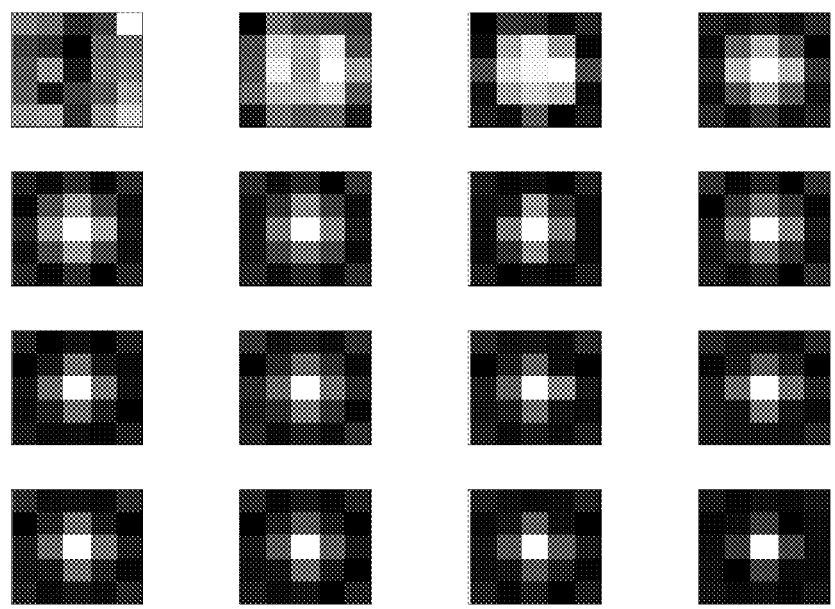
FIGS. 6B-6D are plots of filter generation results.
Figure 6C:
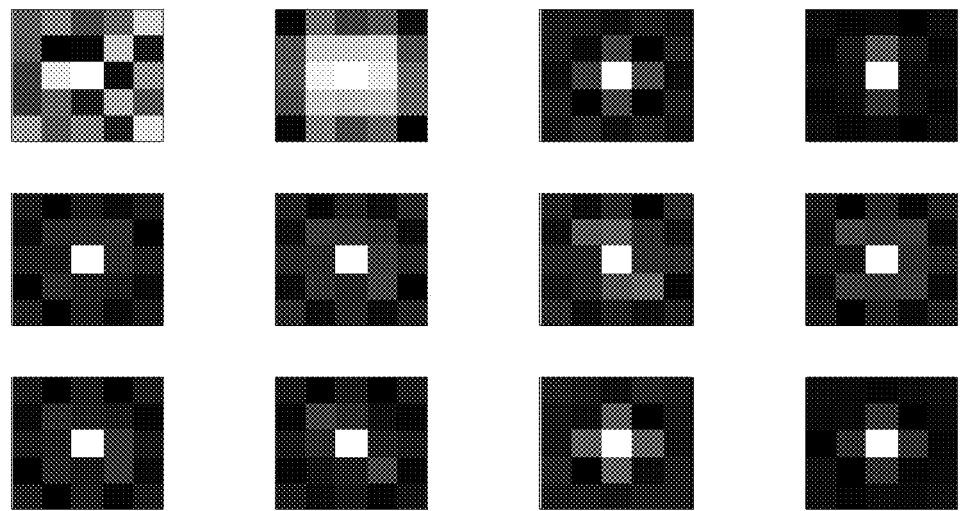
Figure 6D:
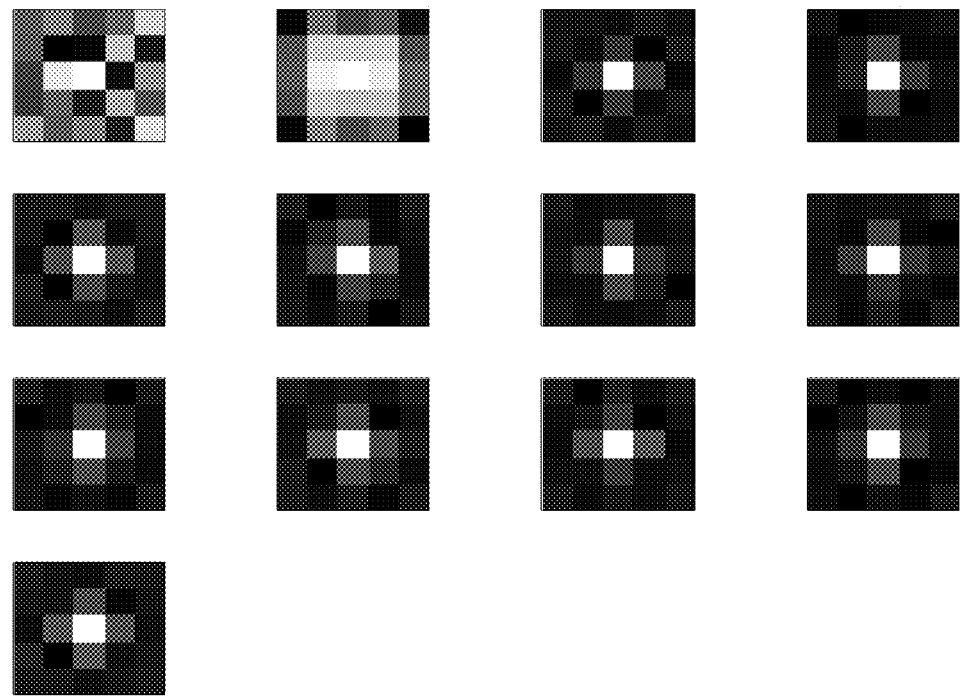

FIG. 6A shows an example test frame from the Cactus sequence. FIG. 6B shows graphic representations of the 16 filters that are generated for the test frame using method 2. FIGS. 6C and 6D show graphic representations of the 12 filters and 13 filters that are generated for the test frame using method 1, for the 8-neighbor LBP and the 4-neighbor LBP, respectively. When comparing the filters resulting from method 1 (FIGS. 6C and 6D) to those resulting from method 2 (FIG. 6B), it is evident that the use of pattern information to determine the filters enables the filters to be more adaptive to the different characteristics of the test frame, with respect to filter shape and orientation.

Figure 7A:
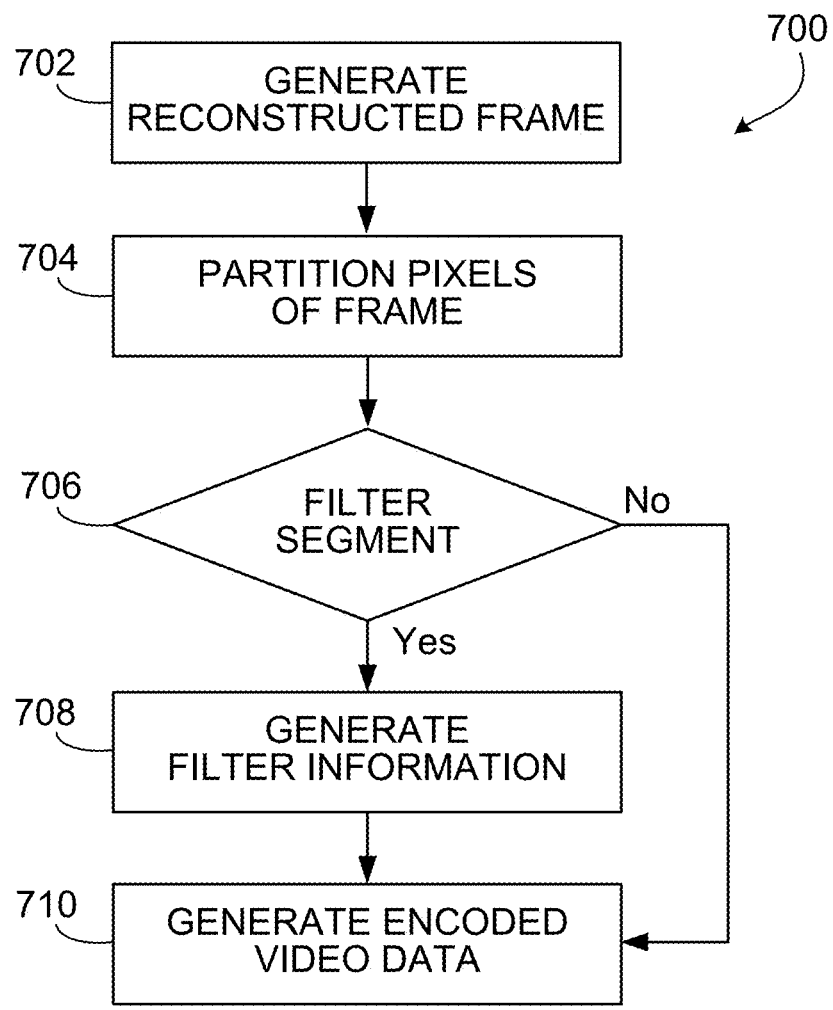
FIG. 7A is a flowchart of an example encoding procedure.

FIG. 7A shows a flowchart for an example procedure 700 that includes generating filter information for a reconstructed frame that is segmented based at least in part on pattern information, which may be part of a procedure performed by an encoder (e.g., encoder 200) that includes additional steps not shown. The procedure 700 includes generating (702) a reconstructed frame from compressed data for an original frame of video data being encoded. The reconstructed frame corresponds to a frame that will be generated at the decoder, and may be used at the encoder for prediction. The procedure 700 includes partitioning (704) at least some pixels of the reconstructed frame into multiple segments of one or more pixels based at least in part on pattern information for individual pixels. For each segment, the procedure 700 determines (706) whether that segment is to be filtered (at the decoder), and generates (708) respective filter information for each of the segments to be filtered. The procedure 700 includes generating (710) encoded video data that includes the compressed data for the original frame, and the generated filter information (for any segments to be filtered).

In some implementations, the decoder may also perform some of the steps of the procedure 700, such as partitioning a reconstructed frame into segments to which different filters will be applied. The decoder may be able to perform the partitioning based at least in part on the some side information in the encoded video data being decoded. For example, the side information may indicate which LBP configuration should be used for partitioning.

Figure 7B:
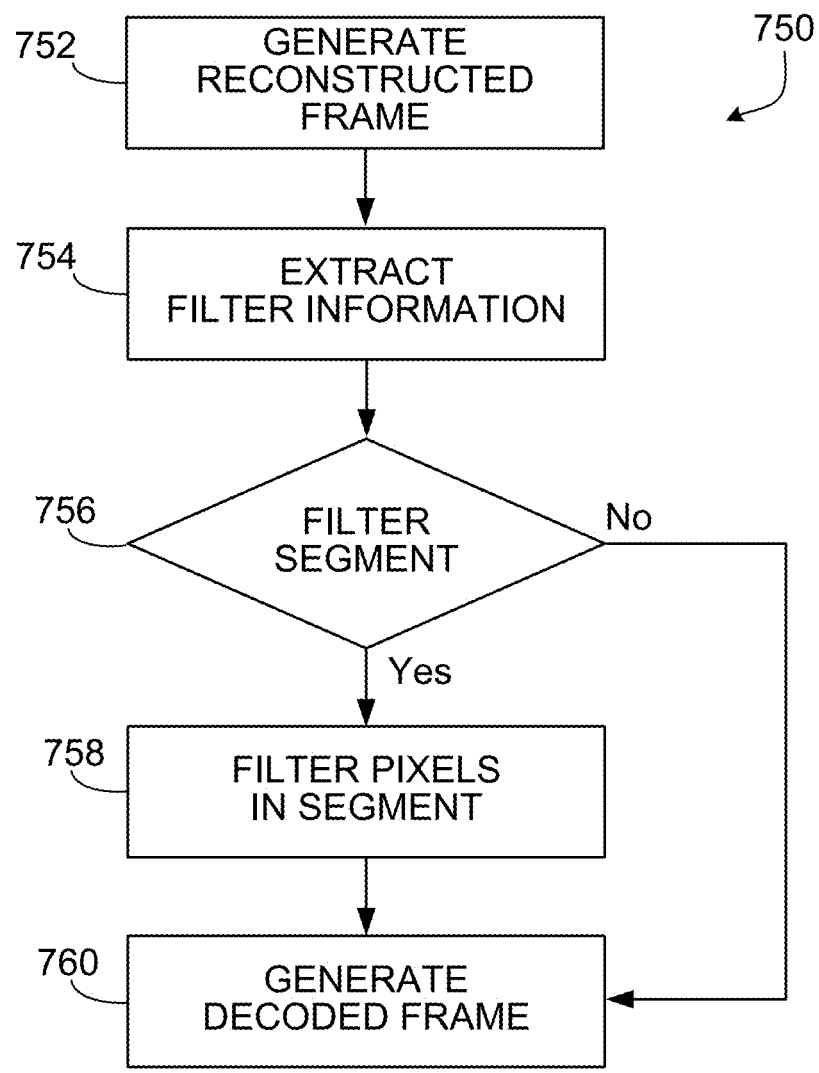
FIG. 7B is a flowchart of an example decoding procedure.

FIG. 7B shows a flowchart for an example procedure 750 that includes filtering data based on the filter information associated with segments that were determined (e.g., by the encoder) based at least in part on pattern information, which may be part of a procedure performed by a decoder (e.g., decoder 250) that includes additional steps not shown. The procedure 750 includes generating (752) a reconstructed frame from encoded video data. The procedure 750 includes extracting (754) from the encoded video data respective filter information for each segment of the reconstructed frame that is to be filtered (after partitioning the pixels into segments, as in procedure 700, based on information in the encoded video data). For each segment, the procedure 750 determines (756) whether that particular segment is to be filtered (e.g., based on whether filter information for that particular segment was extracted), and if so filters (758) pixels in that particular segment by applying a filter derived from the filter information for that particular segment. The procedure 750 generates (760) a decoded frame from the segments after the filtering.

Figure 8A:
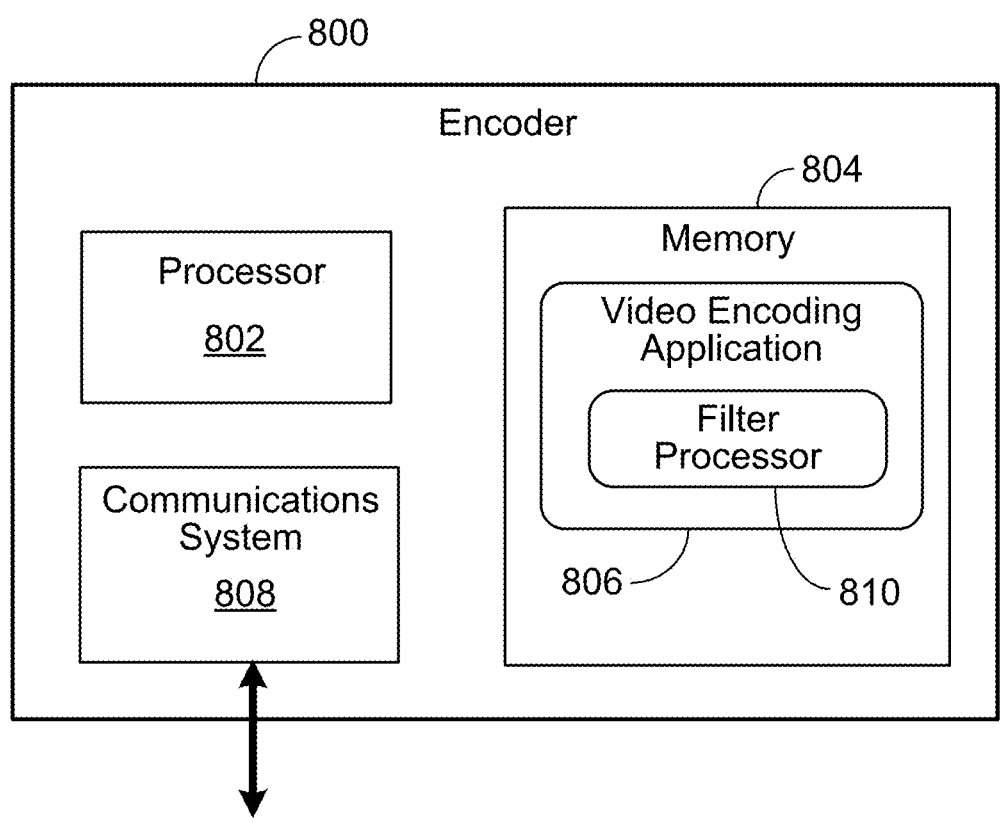
FIG. 8A is a block diagram of an example encoder apparatus.

Reference is now made to FIG. 8A, which shows a simplified block diagram of an example embodiment of an encoder 800. The encoder 800 includes a processor 802, a memory 804 accessible by the processor 802, and a video encoding application 806. The encoding application 506 may include a computer program or application stored in the memory 804 and containing instructions for configuring the processor 802 to perform steps or operations such as those described herein. The encoding application 806 may include one or more components or modules for performing various aspects of the techniques described herein. For example, a filter processor 810, such as the filter processor 240 described herein, can be included as a module of the encoding application 806. The encoding application 806, or any of its modules, may be stored in any combination of the memory 804 of the encoder 800, and any other accessible computer readable storage medium, such as a compact disc, flash memory device, random access memory, hard drive, etc. The encoder 800 also includes a communications interface 808 accessible by the processor 802 to transmit a bitstream comprising encoded video data generated by the processor 802 executing the encoding application 806.

Figure 8B:
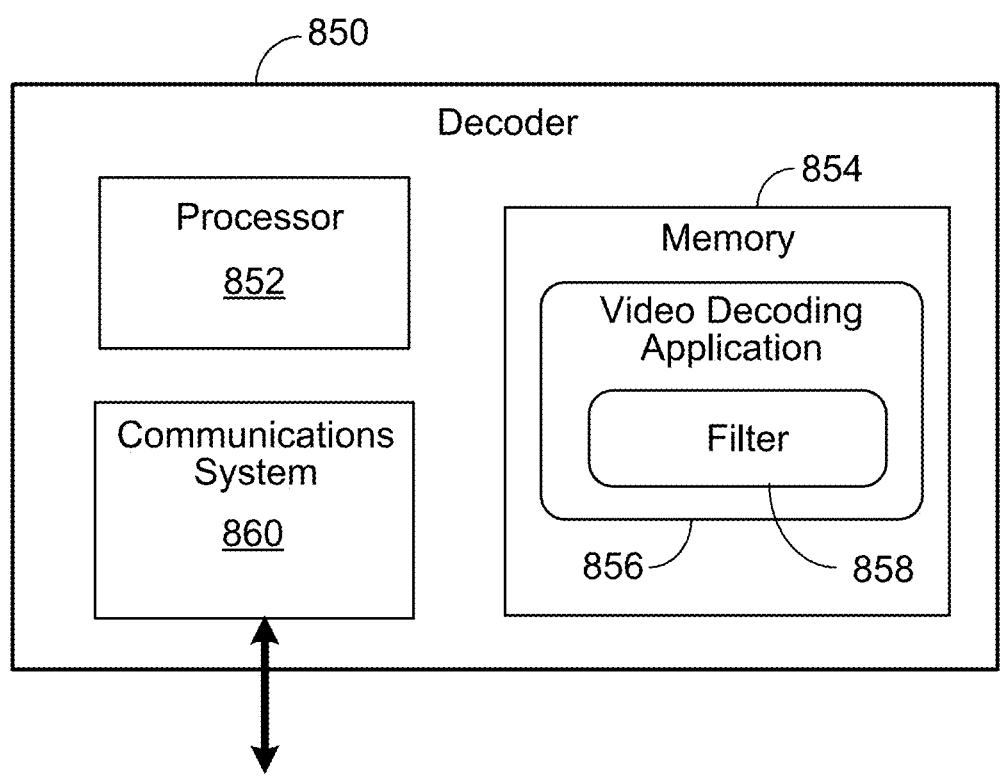
FIG. 8B is a block diagram of an example decoder apparatus.

Reference is now also made to FIG. 8B, which shows a simplified block diagram of an example embodiment of a decoder 850. The decoder 850 includes a processor 852, a memory 854, and a decoding application 856. The decoding application 856 may include a computer program or application stored in the memory 854 and containing instructions for configuring the processor 852 to perform steps or operations such as those described herein. The decoding application 856 may include one or more components or modules for performing various aspects of the techniques described herein. For example, a filter 858, such as the post-loop processor 264 described herein, can be included as a module of the decoding application 856. The decoding application 856, or any of its modules, may be stored in any combination of the memory 854 of the decoder 850, and any other accessible computer readable storage medium, such as a compact disc, flash memory device, random access memory, hard drive, etc. The decoder 850 also includes a communications interface 860 accessible by the processor 852 to receive a bitstream comprising encoded video data to be decoded by the processor 852 executing the decoding application 856.

The decoder and/or encoder may be implemented in a number of computing devices, including, without limitation, servers, suitably programmed general purpose computers, set-top television boxes, television broadcast equipment, and mobile devices. The decoder or encoder may be implemented by way of software containing instructions for configuring a processor to carry out the functions described herein. The software instructions may be stored on any suitable computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The techniques described herein are not limited to particular processors, computer languages, computer programming conventions, data structures, or other such implementation details. The described processes may be implemented as a part of computer-executable code stored in volatile or non-volatile memory, as part of an application-specific integrated chip (ASIC), etc.

In one aspect, in general, a method for encoding video data including a frame includes: generating a reconstructed frame from compressed data for the frame; partitioning at least some pixels of the reconstructed frame into a plurality of segments of one or more pixels, based at least in part on pattern information for individual pixels; generating respective filter information for each of one or more of the plurality of segments; and generating encoded video data that includes the compressed data for the frame, and the generated filter information.

Aspects can include one or more of the following features.

Partitioning at least some pixels of the reconstructed frame into a plurality of segments of one or more pixels, based at least in part on pattern information for individual pixels comprises: partitioning at least some pixels of the reconstructed frame into a plurality of sets of one or more pixels, and partitioning at least a first of the sets of one or more pixels into a plurality of subsets of one or more pixels, based at least in part on pattern information for individual pixels, with at least one segment corresponding to one of the sets and at least one segment corresponding to one of the subsets.

The plurality of sets of one or more pixels are determined based at least in part on variation information for individual pixels.

Pixels that have respective values of the variation information within different ones of multiple ranges belong to different respective ones of the plurality of sets of one or more pixels.

Pattern information for a particular pixel in one of the segments of one or more pixels is determined based at least in part on intensity values of pixels surrounding the particular pixel compared to an intensity value of the particular pixel.

Determining the pattern information for the particular pixel comprises determining respective intensity values associated with multiple reference locations surrounding the particular pixel, and determining whether the intensity value of the particular pixel is larger or smaller than the intensity values associated with the reference locations.

At least one intensity value associated with one of the reference locations is interpolated from intensity values of multiple pixels.

Generating respective filter information for each of one or more of the plurality of segments comprises determining a difference between pixel values in a first segment of the reconstructed frame filtered according to filter information for the first segment and corresponding pixel values of the frame.

The method further comprises generating compressed data for another frame included in the video data, based on the reconstructed frame.

In another aspect, in general, a computer readable storage medium stores a computer program for encoding input data including one or more frames. The computer program includes instructions for causing a computer system to: generate a reconstructed frame from compressed data for the frame; partition at least some pixels of the reconstructed frame into a plurality of segments of one or more pixels, based at least in part on pattern information for individual pixels; generate respective filter information for each of one or more of the plurality of segments; and generate encoded video data that includes the compressed data for the frame, and the generated filter information.

In another aspect, in general, an apparatus for encoding video data including one or more frames includes: a memory configured to buffer one or more frames reconstructed from the video data; and at least one processor coupled to the memory and configured to process the video data based on the one or more frames buffered in the memory. The processing includes: generating a reconstructed frame from compressed data for the frame; partitioning at least some pixels of the reconstructed frame into a plurality of segments of one or more pixels, based at least in part on pattern information for individual pixels; generating respective filter information for each of one or more of the plurality of segments; and generating encoded video data that includes the compressed data for the frame, and the generated filter information.

In another aspect, in general, a method for decoding encoded video data includes: generating a reconstructed frame from the encoded video data; extracting from the encoded video data respective filter information for each of one or more of a plurality of segments of one or more pixels of the reconstructed frame, wherein at least one segment of the plurality of segments was determined based at least in part on pattern information for individual pixels; and filtering pixels in a first segment of the plurality of segments by applying a filter derived from the filter information for the first segment.

Aspects can include one or more of the following features.

Determining the at least one segment, based at least in part on pattern information for individual pixels comprises: partitioning at least some pixels of the reconstructed frame into a plurality of sets of one or more pixels, and partitioning at least a first of the sets of one or more pixels into a plurality of subsets of one or more pixels, based at least in part on pattern information for individual pixels, with at least one segment corresponding to one of the sets and at least one segment corresponding to one of the subsets.

The plurality of sets of one or more pixels are determined based at least in part on variation information for individual pixels.

Pixels that have respective values of the variation information within different ones of multiple ranges belong to different respective ones of the plurality of sets of one or more pixels.

Pattern information for a particular pixel in one of the segments of one or more pixels is determined based at least in part on intensity values of pixels surrounding the particular pixel compared to an intensity value of the particular pixel.

Determining the pattern information for the particular pixel comprises determining respective intensity values associated with multiple reference locations surrounding the particular pixel, and determining whether the intensity value of the particular pixel is larger or smaller than the intensity values associated with the reference locations.

At least one intensity value associated with one of the reference locations is interpolated from intensity values of multiple pixels.

In another aspect, in general, a computer readable storage medium stores a computer program for decoding encoded video data. The computer program includes instructions for causing a computer system to: generate a reconstructed frame from the encoded video data; extract from the encoded video data respective filter information for each of one or more of a plurality of segments of one or more pixels of the reconstructed frame, wherein at least one segment of the plurality of segments was determined based at least in part on pattern information for individual pixels; and filter pixels in a first segment of the plurality of segments by applying a filter derived from the filter information for the first segment.

In another aspect, in general, an apparatus for decoding encoded video data includes: a memory configured to buffer one or more frames reconstructed from the encoded video data; and at least one processor coupled to the memory and configured to process the encoded video data based on the one or more frames buffered in the memory. The processing includes: generating a reconstructed frame from the encoded video data; extracting from the encoded video data respective filter information for each of one or more of a plurality of segments of one or more pixels of the reconstructed frame, wherein at least one segment of the plurality of segments was determined based at least in part on pattern information for individual pixels; and filtering pixels in a first segment of the plurality of segments by applying a filter derived from the filter information for the first segment.

Aspects can have one or more of the following advantages, or other advantages. Partitioning pixels of a frame into multiple segments, to which different filters will be applied, based on pattern information enables increased performance (e.g., as measured by peak signal-to-noise ratio). Segmentation based on pattern information enables a filter processor to distinguish between different spatial characteristics of an image. The filters for the different segments can then be optimized based on the different spatial characteristics. Pattern information also enables a smaller number of filters to be used to achieve a desired performance metric, providing higher processing efficiency due to reduced processing needed to apply the smaller number of filters.

Other features and advantages of the invention are apparent from the present description, and from the claims.

Certain adaptations and modifications of the described embodiments can be made. Therefore, the above discussed embodiments are considered to be illustrative and not restrictive.

What is claimed is:

1. A method for encoding video data including a frame, the method comprising:
   generating a reconstructed frame from compressed data for the frame;
   in response to generating the reconstructed frame, partitioning at least some pixels of the reconstructed frame into a plurality of segments of one or more pixels, wherein at least one segment of the plurality of segments is determined based at least in part on pattern information for individual pixels, wherein partitioning the at least some pixels of the reconstructed frame into the plurality of segments comprises:
      partitioning the at least some pixels of the reconstructed frame into a plurality of sets of one or more pixels, and
      further partitioning at least a first of the sets of one or more pixels into a plurality of subsets of one or more pixels, based at least in part on two-dimensional pattern information for individual pixels, wherein pattern information for a particular pixel is determined based at least in part on intensity values of pixels surrounding the particular pixel compared to an intensity value of the particular pixel,
      with at least one segment corresponding to one of the sets and at least one segment corresponding to one of the subsets;
   subsequent to the partitioning, determining respective filter parameters for each of one or more of the plurality of segments, wherein the respective filter parameters define respective adaptive filters to be applied to respective segments of a reconstructed video frame;
   filtering pixels in a first segment of the one or more of the plurality of segments by applying the adaptive filter defined by the filter parameters for the first segment; and
   generating encoded video data that includes the compressed data for the frame, and information identifying the determined filter parameters.

2. The method of claim 1, wherein the plurality of sets of one or more pixels are determined based at least in part on variation information for individual pixels.

3. The method of claim 2, wherein pixels that have respective values of the variation information within different ones of multiple ranges belong to different respective ones of the plurality of sets of one or more pixels.

4. The method of claim 1, wherein determining the pattern information for the particular pixel comprises determining respective intensity values associated with multiple reference locations surrounding the particular pixel, and determining whether the intensity value of the particular pixel is larger or smaller than the intensity values associated with the reference locations.

5. The method of claim 4, wherein at least one intensity value associated with one of the reference locations is interpolated from intensity values of multiple pixels.

6. The method of claim 1, further comprising determining a difference between pixel values in a first segment of the reconstructed frame filtered according to filter parameters for the first segment and corresponding pixel values of the frame.

7. The method of claim 1, further comprising generating compressed data for another frame included in the video data, based on the reconstructed frame.

8. A computer readable non-transitory medium storing a computer program for encoding input data including one or more frames, the computer program including instructions for causing a computer system to:
   generate a reconstructed frame from compressed data for the frame;
   in response to generating the reconstructed frame, partition at least some pixels of the reconstructed frame into a plurality of segments of one or more pixels, wherein at least one segment of the plurality of segments is determined based at least in part on pattern information for individual pixels, wherein partitioning the at least some pixels of the reconstructed frame into the plurality of segments comprises:
      partitioning the at least some pixels of the reconstructed frame into a plurality of sets of one or more pixels, and
      further partitioning at least a first of the sets of one or more pixels into a plurality of subsets of one or more pixels, based at least in part on two-dimensional pattern information for individual pixels, wherein pattern information for a particular pixel is determined based at least in part on intensity values of pixels surrounding the particular pixel compared to an intensity value of the particular pixel,
      with at least one segment corresponding to one of the sets and at least one segment corresponding to one of the subsets;
   subsequent to the partitioning, determine respective filter parameters for each of one or more of the plurality of segments, wherein the respective filter parameters define respective adaptive filters to be applied to respective segments of a reconstructed video frame;

filter pixels in a first segment of the one of more of the plurality of segments by applying the adaptive filter defined by the filter parameters for the first segment; and generate encoded video data that includes the compressed data for the frame, and information identifying the determined filter parameters.

9. An apparatus for encoding video data including one or more frames, the apparatus comprising:
a memory configured to buffer one or more frames reconstructed from the video data; and
at least one processor coupled to the memory and configured to process the video data based on the one or more frames buffered in the memory, the processing including:
generating a reconstructed frame from compressed data for the frame;
in response to generating the reconstructed frame, partitioning at least some pixels of the reconstructed frame into a plurality of segments of one or more pixels, wherein at least one segment of the plurality of segments is determined based at least in part on pattern information for individual pixels, wherein partitioning the at least some pixels of the reconstructed frame into the plurality of segments comprises:
partitioning the at least some pixels of the reconstructed frame into a plurality of sets of one or more pixels, and
further partitioning at least a first of the sets of one or more pixels into a plurality of subsets of one or more pixels, based at least in part on two-dimensional pattern information for individual pixels, wherein pattern information for a particular pixel is determined based at least in part on intensity values of pixels surrounding the particular pixel compared to an intensity value of the particular pixel,
with at least one segment corresponding to one of the sets and at least one segment corresponding to one of the subsets;
subsequent to the partitioning, generating respective filter parameters for each of one or more of the plurality of segments, wherein the respective filter parameters defines respective adaptive filters to be applied to respective segments of a reconstructed video frame;
filtering pixels in a first segment of the one or more of the plurality of segments by applying the adaptive filter defined by the filter parameters for the first segment; and
generating encoded video data that includes the compressed data for the frame, and information identifying the determined filter parameters.

10. A method for decoding encoded video data, the method comprising:
generating a reconstructed frame from the encoded video data;
in response to generating the reconstructed frame, partitioning at least some pixels of the reconstructed frame into a plurality of segments of one or more pixels, wherein at least one segment of the plurality of segments is determined based at least in part on pattern information for individual pixels, wherein partitioning the at least some pixels of the reconstructed frame into the plurality of segments comprises:
partitioning the at least some pixels of the reconstructed frame into a plurality of sets of one or more pixels, and
further partitioning at least a first of the sets of one or more pixels into a plurality of subsets of one or more pixels, based at least in part on two-dimensional pattern information for individual pixels, wherein pattern information for a particular pixel is determined based at least in part on intensity values of pixels surrounding the particular pixel compared to an intensity value of the particular pixel,
with at least one segment corresponding to one of the sets and at least one segment corresponding to one of the subsets;
extracting from the encoded video data respective filter parameters for each of one or more of the plurality of segments, wherein the respective filter parameters define respective adaptive filters to be applied to respective segments of a reconstructed video frame; and
subsequent to the partitioning, filtering pixels in a first segment of the one or more of the plurality of segments by applying an adaptive filter derived from the filter parameters for the first segment.

11. The method of claim 10, wherein the plurality of sets of one or more pixels are determined based at least in part on variation information for individual pixels.

12. The method of claim 11, wherein pixels that have respective values of the variation information within different ones of multiple ranges belong to different respective ones of the plurality of sets of one or more pixels.

13. The method of claim 10, wherein determining the pattern information for the particular pixel comprises determining respective intensity values associated with multiple reference locations surrounding the particular pixel, and determining whether the intensity value of the particular pixel is larger or smaller than the intensity values associated with the reference locations.

14. The method of claim 13, wherein at least one intensity value associated with one of the reference locations is interpolated from intensity values of multiple pixels.

15. A computer readable non-transitory medium storing a computer program for decoding encoded video data, the computer program including instructions for causing a computer system to:
generating a reconstructed frame from the encoded video data;
in response to generating the reconstructed frame, partitioning at least some pixels of the reconstructed frame into a plurality of segments of one or more pixels, wherein at least one segment of the plurality of segments is determined based at least in part on pattern information for individual pixels, wherein partitioning the at least some pixels of the reconstructed frame into the plurality of segments comprises:
partitioning the at least some pixels of the reconstructed frame into a plurality of sets of one or more pixels, and
further partitioning at least a first of the sets of one or more pixels into a plurality of subsets of one or more pixels, based at least in part on two-dimensional pattern information for individual pixels, wherein pattern information for a particular pixel is determined based at least in part on intensity values of pixels surrounding the particular pixel compared to an intensity value of the particular pixel,
with at least one segment corresponding to one of the sets and at least one segment corresponding to one of the subsets;

extracting from the encoded video data respective filter parameters for each of one or more of the plurality of segments, wherein the respective filter parameters define respective adaptive filters to be applied to respective segments of a reconstructed video frame; and subsequent to the partitioning, filtering pixels in a first segment of the one or more of the plurality of segments by applying an adaptive filter derived from the filter parameters for the first segment.

16. An apparatus for decoding encoded video data, the apparatus comprising:

a memory configured to buffer one or more frames reconstructed from the encoded video data; and at least one processor coupled to the memory and configured to process the encoded video data based on the one or more frames buffered in the memory, the processing including:

generating a reconstructed frame from the encoded video data;

in response to generating the reconstructed frame, partitioning at least some pixels of the reconstructed frame into a plurality of segments of one or more pixels, wherein at least one segment of the plurality of segments is determined based at least in part on pattern information for individual pixels, wherein partitioning the at least some pixels of the reconstructed frame into the plurality of segments comprises:

partitioning the at least some pixels of the reconstructed frame into a plurality of sets of one or more pixels, and further partitioning at least a first of the sets of one or more pixels into a plurality of subsets of one or more pixels, based at least in part on two-dimensional pattern information for individual pixels, wherein pattern information for a particular pixel is determined based at least in part on intensity values of pixels surrounding the particular pixel compared to an intensity value of the particular pixel, with at least one segment corresponding to one of the sets and at least one segment corresponding to one of the subsets;

extracting from the encoded video data respective filter parameters for each of one or more of the plurality of segments, wherein the respective filter parameters define respective adaptive filters to be applied to respective segments of a reconstructed video frame; and subsequent to the partitioning, filtering pixels in a first segment of the one or more of the plurality of segments by applying an adaptive filter derived from the filter parameters for the first segment.

* * * * *